(12) United States Patent
Emmert et al.

(10) Patent No.: US 11,636,523 B2
(45) Date of Patent: Apr. 25, 2023

(54) INVOICE DETERMINATION SYSTEM

(71) Applicant: Aktiebolaget SKF, Gothenburg (SE)

(72) Inventors: Michael Emmert, Willmars (DE);
Wolfgang Glaentz, Schweinfurt (DE);
Sebastian Ziegler, Bamberg (DE)

(73) Assignee: Aktiebolaget SKF, Gothenburg (SE)

( * ) Notice: Subject to any disclaimer, the term of this patent is extended or adjusted under 35 U.S.C. 154(b) by 90 days.

(21) Appl. No.: 17/005,464

(22) Filed: Aug. 28, 2020

(65) Prior Publication Data
US 2021/0073878 A1 Mar. 11, 2021

(30) Foreign Application Priority Data

Sep. 10, 2019 (DE) .......................... 102019213767.9

(51) Int. Cl.
G07F 19/00 (2006.01)
G06Q 30/04 (2012.01)
G06Q 50/06 (2012.01)
G06Q 50/04 (2012.01)
G06Q 30/0283 (2023.01)

(52) U.S. Cl.
CPC ......... *G06Q 30/04* (2013.01); *G06Q 30/0283* (2013.01); *G06Q 50/04* (2013.01); *G06Q 50/06* (2013.01)

(58) Field of Classification Search
CPC ..... G06Q 30/04; G06Q 30/0283; G06Q 50/04
USPC ....................................................... 705/34
See application file for complete search history.

(56) References Cited

U.S. PATENT DOCUMENTS

| 10,555,058 | B2 | 2/2020 | Pinkerton |
| 2002/0107794 | A1* | 8/2002 | Furphy .............. G06Q 10/0875 705/40 |
| 2016/0236522 | A1 | 8/2016 | Taki |
| 2017/0219279 | A1 | 8/2017 | Chae |

FOREIGN PATENT DOCUMENTS

| DE | 3028808 A1 | 3/1982 |
| DE | 3936542 C1 | 4/1991 |
| DE | 102017200483 A1 | 7/2018 |
| DE | 102018216487 A1 | 3/2020 |
| EP | 2514969 A2 * | 10/2012 ............. F03D 15/00 |

OTHER PUBLICATIONS

Erstes batterieloses Bluetooth-Sensor-Tag für IoT-Anwendungen, Jan. 28, 2019 I Redakteur: Michael Eckstein, Elektronik Praxis.

* cited by examiner

*Primary Examiner* — Rokib Masud
(74) *Attorney, Agent, or Firm* — Garcia-Zamor Intellectual Property Law, LLC; Ruy Garcia-Zamor

(57) ABSTRACT

Invoice determination system for determining an invoice for at least an item bought by a client providing at least a means for measurement linked to the at least one item, a first processing means connected to a first memory storing a client database, and a second processing means connected to a second memory storing a supplier database, each item being identified by a unique identifier, the first and second processing means being configured to execute a process providing the necessary steps in order to emit an invoice including the price to be charged to the client.

15 Claims, 1 Drawing Sheet

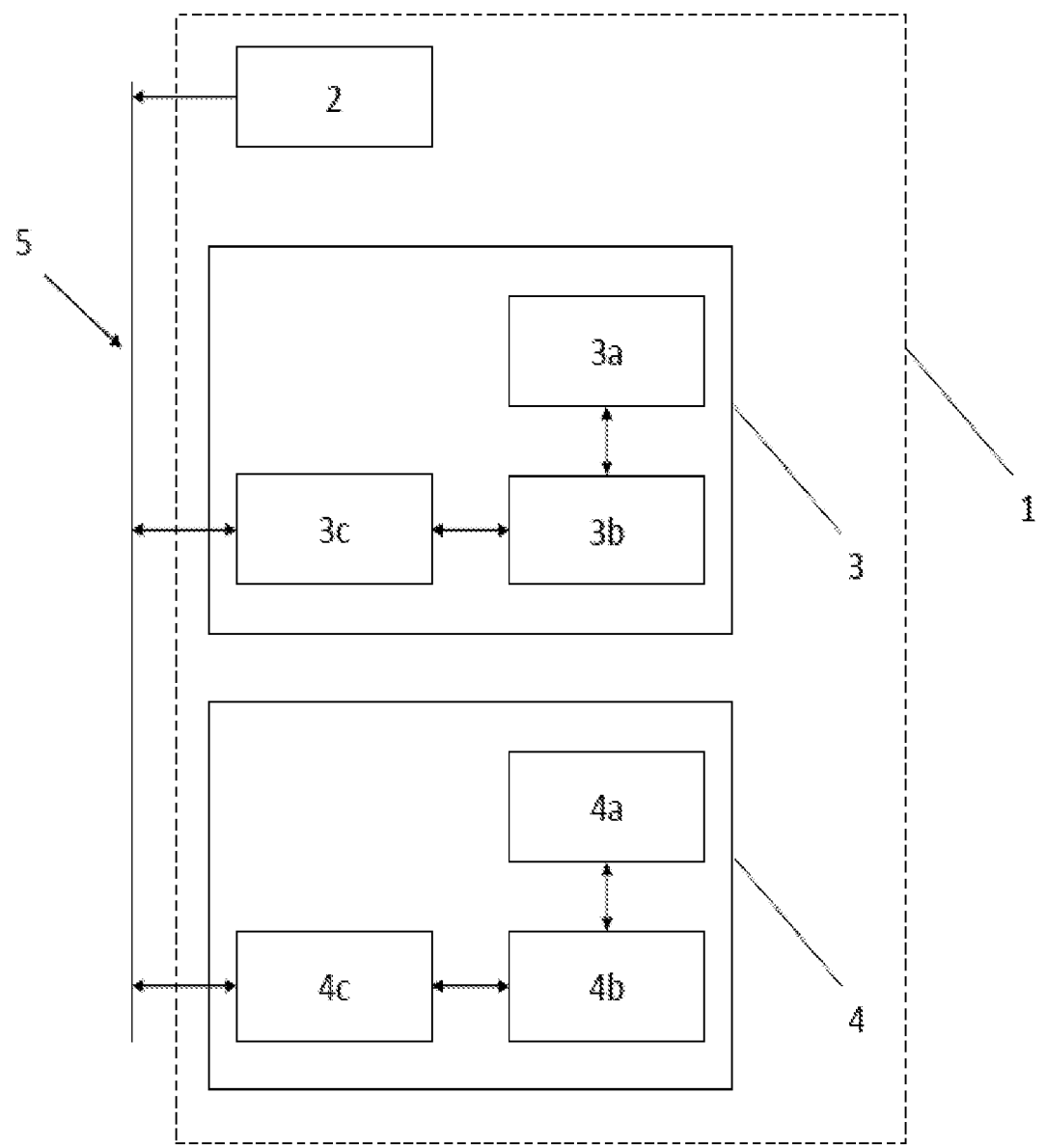

INVOICE DETERMINATION SYSTEM

CROSS-REFERENCE TO RELATED APPLICATIONS

This application claims priority to German Patent Application no. 102019213767.9, filed Sep. 10, 2019, the contents of which is fully incorporated herein by reference.

TECHNICAL FIELD OF THE INVENTION

The present invention relates to computer systems, and more particularly to such systems for determining and processing invoices.

BACKGROUND OF THE INVENTION

The basic way for determining trade fees is linked to bulk trading, wherein a price is set of a quantity of goods. The invoice is then based on the quantity of goods delivered time the unitary price agreed on.

Similarly, a fee may provide determined for a duration of use of a product. The invoice is then based on the duration of usage time the price per hour or day.

Such basic forms of invoicing form the basis of trading since countless years and rely heavily of human interactions for precontractual agreement and for invoices based on actual delivery. However, such a practice shows signs of obsolescence in the digital age. With increasing ways to measure position, time and mass, and to determine performances, reliability or almost any parameter, there is a need for an improved way of determining invoices.

Moreover, determining invoices is currently based on human interactions based on outstanding contracts. Human interactions are known to be prone to errors in particular when contracts involve a large number of parameters having an effect of the final invoice. human interactions based invoice determination is also limited in the number of parameters that may provide taken into account and in their updating rate. Such limitations are incompatible with today possibilities in terms of measurements and resulting quantity of data to handle. Human interactions are also time consuming in a world of speed and efficiency.

There is a need for an improved way of determining invoice solving the issue identified above.

SUMMARY OF THE INVENTION

An aspect of the invention is an invoice determination system for determining an invoice for at least an item bought by a client, comprising at least a means for measurement linked to the at least one item, a first processing means connected to a first memory storing a client database, and a second processing means connected to a second memory storing a supplier database, each item is identified by a unique identifier transmitted alongside a parameter measured, the first and second processing means being configured to execute a process comprising the following steps:

determining within the first processing means a performance indicating parameter for each unique identifier based on the at least one parameter measured by the at least one means for measurement and a model, storing each performance indicating parameter with the corresponding unique identifier and the time of determination, in the client database, retrieving at least one entry for at least one unique identifier from the client database by the second processing means, retrieving commercial parameters for at least one unique identifier from the supplier database, determining within the second processing means the price to be charged for at least one unique identifier based on the at least one entry retrieved from the client database and on the commercial parameters retrieved from the supplier database, emitting an invoice comprising the price to be charged to the client.

A performance indicating parameter for one unique identifier can depend on at least one performance indicating parameter for at least one other unique identifier.

Connection of the second processing means to the first processing means may provide periodic or condition based.

The commercial parameters may provide a mathematical model or a condition-based model.

The invoice with the price to be charged is sent by mail, by email or both.

The item may provide a bearing, a ship, a steel mill or a windmill.

The first processing means and the second processing means may provide the same processing means.

Another aspect of the invention is a process for determining an invoice for at least an item bought by a client, each item being identified by a unique identifier transmitted alongside a parameter measured. The process comprises the following steps:

determining within a first processing means a performance indicating parameter for each unique identifier based on at least one parameter measured by at least one means for measurement linked to the at least one item and a model, storing each performance indicating parameter with the corresponding unique identifier and the time of determination, in a client database, retrieving at least one entry for at least one unique identifier from the client database by a second processing means, retrieving commercial parameters for at least one unique identifier from the supplier database, determining within the second processing means the price to be charged for at least one unique identifier based on the at least one entry retrieved from the client database and on the commercial parameters retrieved from the supplier database, emitting an invoice comprising the price to be charged to the client.

The first processing means and the second processing means may provide the same processing means.

The item may provide a bearing, a ship, a steel mill or a windmill.

BRIEF DESCRIPTION OF THE DRAWINGS

The present invention will be better understood from studying the detailed description of a number of embodiments considered by way of entirely non-limiting examples and illustrated by the attached drawing in which:

FIG. 1 shows the main components of an invoice determination system according to the invention,

DETAILED DESCRIPTION OF SOME EMBODIMENTS

As a first example of an invoice determination system is applied to the invoicing of bearings embedded with a sensor, said invoicing depending on the reliability of the bearings. Such a bearing can monitor its failure rate which may provide transmitted to a first processing means and stored in a client database. The client database can average and/or filter the data received to determine a performance indicating parameter linked for the bearing, based on the average failure rate for a shipping of bearings.

Based on the performance indicating parameter and a model of commercial parameters agreed on beforehand by the client and the supplier and stored on a second processing means in a supplier database, the second processing means is able to determine the fee to bill and invoices the client accordingly.

The man of the art will understand that such a fee depends directly on the rate of failure of the bearing, a higher rate of failure most likely leading to a lower fee.

Another example of the invoice determination system is applied to ship, comprising sensors in each of its main component, i.e. propulsion, bearing, systems for handling the transported goods.

Each component reports its reliability and performance to a client processing means. The client database determines a performance indicating parameter linked to the performance of each component of the ship thanks to a predefined model.

Based on the performance indicating parameter and a model of commercial parameters agreed on beforehand by the client and the supplier and stored on a second processing means in a supplier database, the second processing means is able to determine the fee to bill for the ship and invoices the client accordingly.

The man of the art will understand that such a fee depends directly on the rate of failure and performance of the components of the ship, a higher rate of failure most likely leading to a lower fee, a higher performance most likely leading to a higher fee and each component having a different impact of the time required by the ship to deliver goods between two harbours.

Similar example may provide given for a windmill, a steel mill or any complex system.

In regard with FIG. 1, the main components of the invoice determination system will now be described.

The invoice determination system 1 comprises at least a means for measurement 2, a first processing means 3 connected to a first memory 3a storing a client database, and a second processing means 4 connected to a second memory 4a storing a supplier database. The first and second processing means also comprise processing means 3b,4b and networking devices 3c,4c enabling connecting each processing means to a network 5 for data exchange.

The means for measurement 2 are linked to an item involved in a product or a service, enabling the measurement of at least one parameter or variable linked to the item involved in the product or service. The means for measurement may provide a rotation sensor for determining the speed of rotation of an item, or a temperature sensor for determining the temperature of an item. It will be understood that the means for measurement may provide any kind of sensor enabling the measurement of a parameter or variable linked to an item.

Each item is identified by a unique identifier. The means for measurement 2 send the at least one parameter measured along with the unique identifier to the first processing means 3. The unique identifier is coded within the means for measurement 2.

For each unique identifier, the first processing means 3 determines a performance indicating parameter based on the at least one parameter measured. A mathematical model or a condition-based model is used to determine the performance indicating parameter. In a particular embodiment, a performance indicating parameter for one unique identifier depends on at least one performance indicating parameter for at least one other unique identifier. This is the case, for complex systems, like a ship comprising multiple components, each component being fitted at least a sensor and a unique identifier along with a performance indicating parameter. The ship performance indicating parameter then depends on its component performance indicating parameters.

The first processing means 3 stores entries linking each performance indicating parameter with the corresponding unique identifier and the time of determination, in the client database.

The second processing means 4 connects to the first processing means 3 for retrieval from the client database of at least one entry for at least one unique identifier. Connection of the second processing means 4 to the first processing means 3 may provide periodic or condition based.

The second processing means 4 retrieves commercial parameters for at least one unique identifier from the supplier database. In an embodiment, the commercial parameters are a mathematical model or a condition-based model.

The second processing means 4 determines the price to be charged for at least one unique identifier based on at least one entry retrieved from the client database and on the commercial parameters retrieved from the supplier database.

The second processing means 4 emits a predetermined invoice with the price to be charged to the client either by mail or by email.

Depending on the embodiment, the first processing means may provide attached to a machine, on-site, on a ship, or a central mainframe in a customer plant. The second processing means may provide a computer, cloud-based or in a central mainframe.

The invention claimed is:

1. A system for determining an invoice for a bearing bought by a client, the system comprising:
   the bearing having a unique identifier,
   a sensor linked to the bearing, the sensor being configured to send a sensor signal representing a bearing measurement,
   a first processor connected to a first memory configured to store a client database, the processor being configured to automatically receive the sensor signal from the sensor and store the bearing measurement in the client database,
   a second processor connected to a second memory and configured to store a supplier database which includes a predefined model, the predefined model including at least one commercial bearing parameter,
   the first processor being configured to identify the bearing using the unique identifier transmitted alongside the sensor signal, the first processor and the second processor being configured to execute a process comprising the following steps:
   determining by the first processor a performance indicating parameter for each unique identifier received from the bearing based on the bearing measurement received from the sensor,
   storing by the first processor of the performance indicating parameter with the unique identifier associated therewith and the time of determination, in the client database, retrieving at least one entry for the unique identifier from the client database in the first processor by the second processor, the second processor retrieving the performance indicating parameter from the first processor and referencing the predefined model stored on the second processor to identify the at least one commercial bearing parameter for the unique identifier from the supplier database, determining by the second processor a price to be charged for a new bearing of a same type as the bearing identified by the unique identifier retrieved from the client database and on the at least one commercial bearing parameter identified in the supplier database located in the second process, the second processor automatically generating an invoice comprising the price to be charged to the client, transmitting of the invoice by the second processor over a network.

2. The system of claim 1, wherein a performance indicating parameter for one unique identifier depends on at least one performance indicating parameter for at least one other unique identifier.

3. The system of claim 1, wherein connection of the second processing means to the first processing means is periodic or condition based.

4. The system of claim 1, wherein the commercial parameters are a mathematical model or a condition-based model.

5. The system of claim 1, wherein the invoice with the price to be charged is sent by email.

6. The system of claim 1, wherein the item is a bearing, a ship, a steel mill or a windmill.

7. The system of claim 1, wherein the first processing means and the second processing means are the same processing means.

8. A combination windmill and a system for determining an invoice for a bearing bought by a client, the system comprising:
a windmill;
the bearing disposed in the windmill and having a unique identifier;
a sensor linked to the bearing, the sensor being configured to send a sensor signal representing a bearing measurement;
a first processor connected to a first memory configured to store a client database, the processor being configured to automatically receive the sensor signal from the sensor and store the bearing measurement in the client database;
a second processor connected to a second memory and configured to store a supplier database which includes a predefined model, the predefined model including at least one commercial bearing parameter;
the first processor being configured to identify the bearing using the unique identifier transmitted alongside the sensor signal, the first processor and the second processor being configured to execute a process comprising the following steps:
determining by the first processor a performance indicating parameter for each unique identifier received from the bearing based on the bearing measurement received from the sensor;
storing by the first processor of the performance indicating parameter with the unique identifier associated therewith and the time of determination, in the client database;
retrieving at least one entry for the unique identifier from the client database in the first processor by the second processor;
the second processor retrieving the performance indicating parameter from the first processor and referencing the predefined model stored on the second processor to identify the at least one commercial bearing parameter for the unique identifier from the supplier database,
determining by the second processor a price to be charged for a new bearing of a same type as the bearing identified by the unique identifier retrieved from the client database and on the at least one commercial bearing parameter identified in the supplier database located in the second process,
the second processor automatically generating an invoice comprising the price to be charged to the client, transmitting of the invoice by the second processor over a network.

9. The combination of claim 8, wherein connection of the second processing means to the first processing means is periodic.

10. The combination of claim 8, wherein connection of the second processing means to the first processing means is condition based.

11. The combination of claim 8, wherein a performance indicating parameter for one unique identifier depends on at least one performance indicating parameter for at least one other unique identifier.

12. A combination ship and a system for determining an invoice for a bearing bought by a client, the system comprising:
a ship;
the bearing connected to the ship and having a unique identifier;
a sensor linked to the bearing, the sensor being configured to send a sensor signal representing a bearing measurement;
a first processor connected to a first memory configured to store a client database, the processor being configured to automatically receive the sensor signal from the sensor and store the bearing measurement in the client database;
a second processor connected to a second memory and configured to store a supplier database which includes a predefined model, the predefined model including at least one commercial bearing parameter;
the first processor being configured to identify the bearing using the unique identifier transmitted alongside the sensor signal, the first processor and the second processor being configured to execute a process comprising the following steps:
determining by the first processor a performance indicating parameter for each unique identifier received from the bearing based on the bearing measurement received from the sensor;
storing by the first processor of the performance indicating parameter with the unique identifier associated therewith and the time of determination, in the client database;
retrieving at least one entry for the unique identifier from the client database in the first processor by the second processor;
the second processor retrieving the performance indicating parameter from the first processor and referencing the predefined model stored on the second processor to identify the at least one commercial bearing parameter for the unique identifier from the supplier database, determining by the second processor a price to be charged for a new bearing of a same type as the bearing identified by the unique identifier retrieved from the client database and on the at least one commercial bearing parameter identified in the supplier database located in the second process, the second processor automatically generating an invoice comprising the price to be charged to the client, transmitting of the invoice by the second processor over a network.

13. The combination of claim 12, wherein connection of the second processing means to the first processing means is periodic.

14. The combination of claim 12, wherein connection of the second processing means to the first processing means is condition based.

15. The combination of claim 12, wherein a performance indicating parameter for one unique identifier depends on at least one performance indicating parameter for at least one other unique identifier.

\* \* \* \* \*